United States Patent
Lahr et al.

(10) Patent No.: US 10,775,881 B1
(45) Date of Patent: Sep. 15, 2020

(54) HIGH ASSURANCE HEAD TRACKER MONITORING AND CALIBRATION

(71) Applicant: Rockwell Collins, Inc., Cedar Rapids, IA (US)

(72) Inventors: Weston J. Lahr, Sherwood, OR (US); Carlo L. Tiana, Portland, OR (US); Robert B. Wood, Beaverton, OR (US); Gary J. Albert, Tualatin, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 19 days.

(21) Appl. No.: 16/111,645

(22) Filed: Aug. 24, 2018

(51) Int. Cl.
| | |
|---|---|
| *G06F 3/01* | (2006.01) |
| *G06T 7/80* | (2017.01) |
| *G06T 7/70* | (2017.01) |
| *G06T 7/00* | (2017.01) |
| *G06T 7/62* | (2017.01) |
| *B64D 47/08* | (2006.01) |

(52) U.S. Cl.
CPC ............ *G06F 3/012* (2013.01); *B64D 47/08* (2013.01); *G06T 7/0002* (2013.01); *G06T 7/62* (2017.01); *G06T 7/70* (2017.01); *G06T 7/80* (2017.01); *G06T 2207/30268* (2013.01)

(58) Field of Classification Search
CPC ... G06F 3/012; G06T 7/80; G06T 7/62; G06T 7/70; G06T 7/0002; G06T 2207/30268; B64D 47/08

USPC .......................................................... 348/169
See application file for complete search history.

(56) References Cited

U.S. PATENT DOCUMENTS

| | | | |
|---|---|---|---|
| 2015/0071524 A1* | 3/2015 | Lee .................... | G06K 9/00208 382/154 |
| 2019/0041979 A1* | 2/2019 | Kirchner .............. | G01C 21/165 |
| 2019/0076195 A1* | 3/2019 | Shalayev ................. | A61B 6/03 |
| 2019/0333478 A1* | 10/2019 | Mott ................... | G06K 9/00664 |

* cited by examiner

*Primary Examiner* — Hee-Yong Kim
(74) *Attorney, Agent, or Firm* — Suiter Swantz pc llo

(57) ABSTRACT

A computer system with one or more cameras monitors the head poses produced by a head-tracking system and produces a pass/fail indication that the head poses are reliable in a high assurance environment. The system may identify individual fiducials and independently verifying that they conform to the computed pose; and/or compute a location of fiducials as would be observed by a single verification camera and compare the computed locations to actual observed locations. The verification camera may be part of a second head-tracking system, utilized while not operating in its ordinary capacity. The computer system may also calibrate the head-tracking system to account for temperature and pressure fluctuations and perform image stabilization before the image frames are passed to the head-tracking system for processing by observing separate fiducials in fixed locations relative to the camera.

14 Claims, 8 Drawing Sheets

HIGH ASSURANCE HEAD TRACKER MONITORING AND CALIBRATION

BACKGROUND

Existing head-tracking systems are generally not designed for, and do not conform to high design assurance standards for aircraft operations such as defined by DO-178B (Software Considerations in Airborne Systems and Equipment Certification). Consumer grade systems designed for video games and other non-critical applications may not produce a head pose estimation that satisfies Design Assurance Level (DAL) B or higher for hazardous failure but are less expensive than other customized solutions.

Consequently, it would be advantageous if an apparatus existed that is suitable for monitoring poses generated by commercially available head-tracking solutions to enforce a high level of assurance.

SUMMARY

In one aspect, embodiments of the inventive concepts disclosed herein are directed to a computer system with one or more cameras for recognizing individual fiducials of a separate head-tracking system and pass or fail the head pose generated by that head-tracking system.

In some embodiments, the computer system computes a location of fiducials as would be observed by a single verification camera, separate from the head-tracking system, and compare the computed location to actual observed locations by that verification camera. In some embodiments, the verification camera is part of a second head-tracking system.

In a further aspect, the computer system calibrates the head-tracking system to account for temperature and pressure fluctuations that may alter the relative locations of the head-tracking fiducials.

In a further aspect, the computer system includes a separate fiducial specific to each camera in the head-tracking system that is disposed in a fixed location relative to the fixed camera to allow the computer system to perform image stabilization before the image frames are passed to the head-tracking system for processing.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
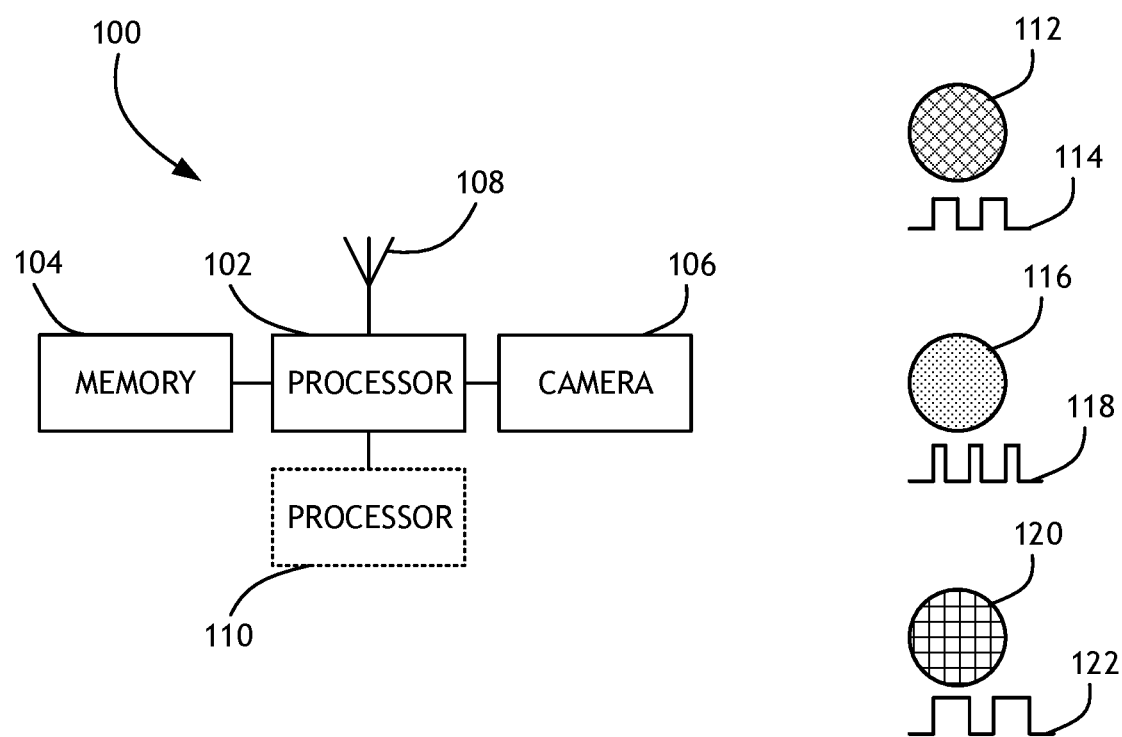
FIG. 1 shows a block diagram of a computer system according to an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for monitoring the function of head-tracking systems and calibrating head-tracking systems on the fly in a dynamic and noisy environment.

Referring to FIG. 1, a block diagram of a computer system 100 according to an embodiment of the inventive concepts disclosed herein is shown. The system 100 includes a processor 102, memory 104 connected to the processor 102 for storing processor executable code, and a camera 106 connected to the processor 102. The system 100 may be incorporated into a head-tracking system having a separate head-tracking processor 110, or in data communication with the head-tracking processor 110.

The head-tracking processor 110 determines a pose based on a plurality of fiducials 112, 116, 120 as observed by one or more head-tracking cameras. The head-tracking processor 110 calculates a pose of person's head, such as a pilot, where the plurality of fiducials 112, 116, 120 are disposed at known locations of the person's helmet and the one or more head-tracking cameras are disposed at known locations to view the plurality of fiducials 112, 116, 120 within a defined area. In some scenarios, the head-tracking processor 110 may produce an erroneous pose if the head-tracking processor 110 misidentifies or incorrectly or otherwise inaccurately locates the plurality of fiducials 112, 116, 120.

Some optical head-tracking systems utilize actively illuminated fiducials. In at least one embodiment, each of the plurality of fiducials 112, 116, 120 may be associated with a unique light pulse frequency 114, 118, 122, or pattern, potentially in a non-visible spectrum. Furthermore, each pulse frequency 114, 118, 122 may be outside of a range distinguishable by a person (i.e. frequencies too fast to be observed) and compliant with DAL B requirements for hazardous failure. The camera 106 may be configured to operate within the spectrum and frequency range of the pulse frequencies 114, 118, 122 and deliver an observed position of each fiducial 112, 116, 120 and corresponding pulse frequency 114, 118, 122 such that the processor 102 can uniquely identify each fiducial 112, 116, 120.

In at least one embodiment, each fiducial 112, 116, 120 may be uniquely identified via a quick-response (QR) code, ArUco code, or other such artifice.

The processor 102 receives the calculated pose from the head-tracking processor 110 and calculates the positions of the plurality of fiducials 112, 116, 120 used by the head-tracking processor 110. The processor 102 then compares the calculated positions to the observed positions. Such comparison may include validation of the pulse frequencies 114, 118, 122, validation of geometric or temporal relationship between the pulse frequencies 114, 118, 122, or both. If the calculated positions and observed positions are consistent, the processor 102 outputs a pass indication to an avionics system utilizing the pose, either via a wired or wireless datalink element 108, indicating that the pose is accurate and conforms to high design assurance standards for aircraft. Otherwise, the processor 102 outputs a fail indication to the avionics system.

Figure 2:
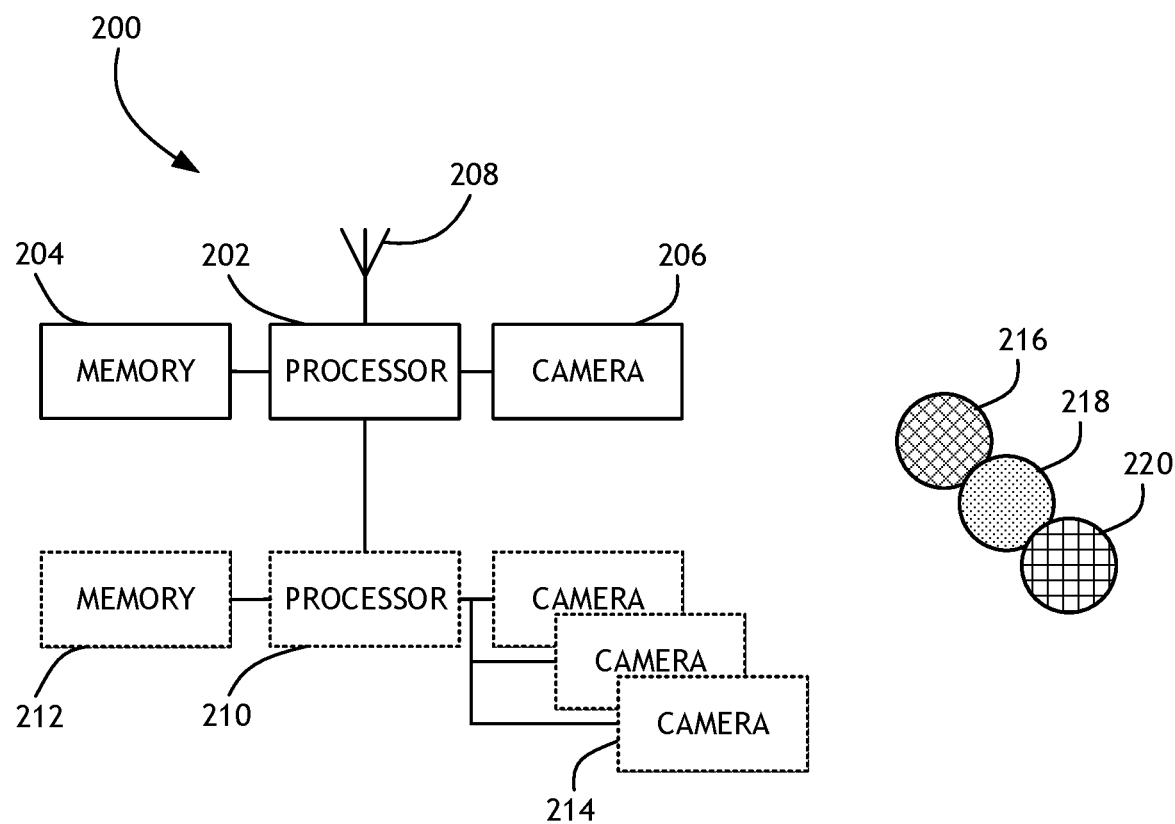
FIG. 2 shows a block diagram of a computer system according to an embodiment of the inventive concepts disclosed herein.

Referring to FIG. 2, a block diagram of a computer system according to an embodiment of the inventive concepts disclosed herein is shown. The system 200 includes a processor 202, memory 204 connected to the processor 202 for storing processor executable code, and a camera 206 connected to the processor 202. The system 200 may be incorporated into a head-tracking system having a separate head-tracking processor 210, or in data communication with the head-tracking processor 210. The head-tracking processor 210, executing processor executable code stored in a connected memory 212, determines a pose based on a plurality of fiducials 216, 218, 220 disposed at known locations, as observed by one or more head-tracking cameras 214. In at least one embodiment, the determined pose is relayed to the processor 202 as a low-bandwidth 3D point cloud stream.

In at least one embodiment, the processor 202 calculates a pose that would be observed by the camera 206 if the pose calculated by the head-tracking processor 210 is accurate. The processor 202 also receives an observed pose from the camera 206. The processor 202 then compares the calculated pose to the observed pose. If the calculated pose and observed pose are consistent, the processor 202 outputs a pass indication to an avionics system utilizing the pose, either via a wired or wireless datalink element 208, indicating that the pose is accurate and conforms to high design assurance standards for critical applications, such as in aircraft or other vehicles. Otherwise, the processor 202 outputs a fail indication to the avionics system.

Figure 3:
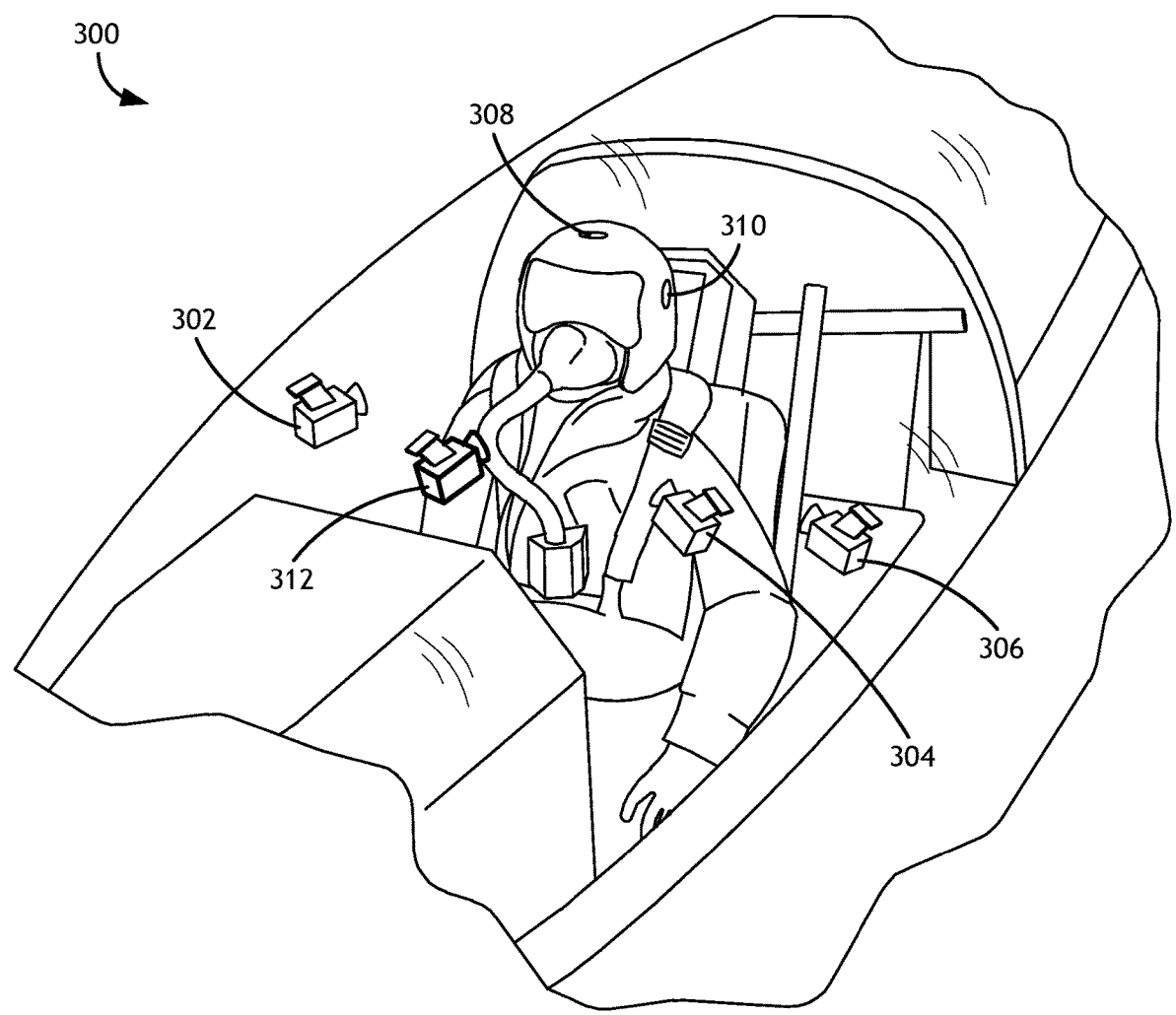
FIG. 3 shows an environmental view of a system according to an embodiment of the inventive concepts disclosed herein.

Referring to FIG. 3, an environmental view of a system 300 according to an embodiment of the inventive concepts disclosed herein is shown. The system 300 includes or is in data communication with an on-board computer system having one or more head-tracking cameras 302, 304, 306 mounted at known positions in an aircraft cockpit to observe a plurality of fiducials 308, 310. Potentially disposed on a pilot's helmet. A processor determines a pose based on the plurality of fiducials 308, 310 as observed by the one or more head-tracking cameras 302, 304, 306.

The system 300 also includes at least one verification camera 312, separate from the head-tracking cameras 302, 304, 306. In at least one embodiment, the system 300 calculates a pose that would be observed by at least one verification camera 312 if the pose calculated based on the head-tracking cameras 302, 304, 306 is accurate. The system 300 then compares the pose calculated based on the head-tracking cameras 302, 304, 306 to the posed calculated to correspond to the verification camera 312. If the poses are consistent, the system 300 outputs a pass indication to an avionics system utilizing the pose indicating that the pose is accurate and conforms to high design assurance standards for aircraft. Otherwise, the system 300 outputs a fail indication to the avionics system.

Alternatively, or in addition, in at least one embodiment, each of the fiducials 308, 310 may be configured to flash at a specific frequency or include some other artifice for uniquely identifying each fiducial 308, 310 without interfering with the head-tracking cameras 302, 304, 306. The system 300, receives the pose calculated based on the head-tracking cameras 302, 304, 306 and determines a projected location for each unique fiducial 308, 310, as observed by the verification camera 312. The system 300 then compares the projected locations to fiducial locations actually observed by the verification camera 312. If the fiducial locations are consistent, the system 300 outputs a pass indication to an avionics system utilizing the pose indicating that the pose is accurate and conforms to high design assurance standards for aircraft. Otherwise, the system 300 outputs a fail indication to the avionics system.

Figure 4:
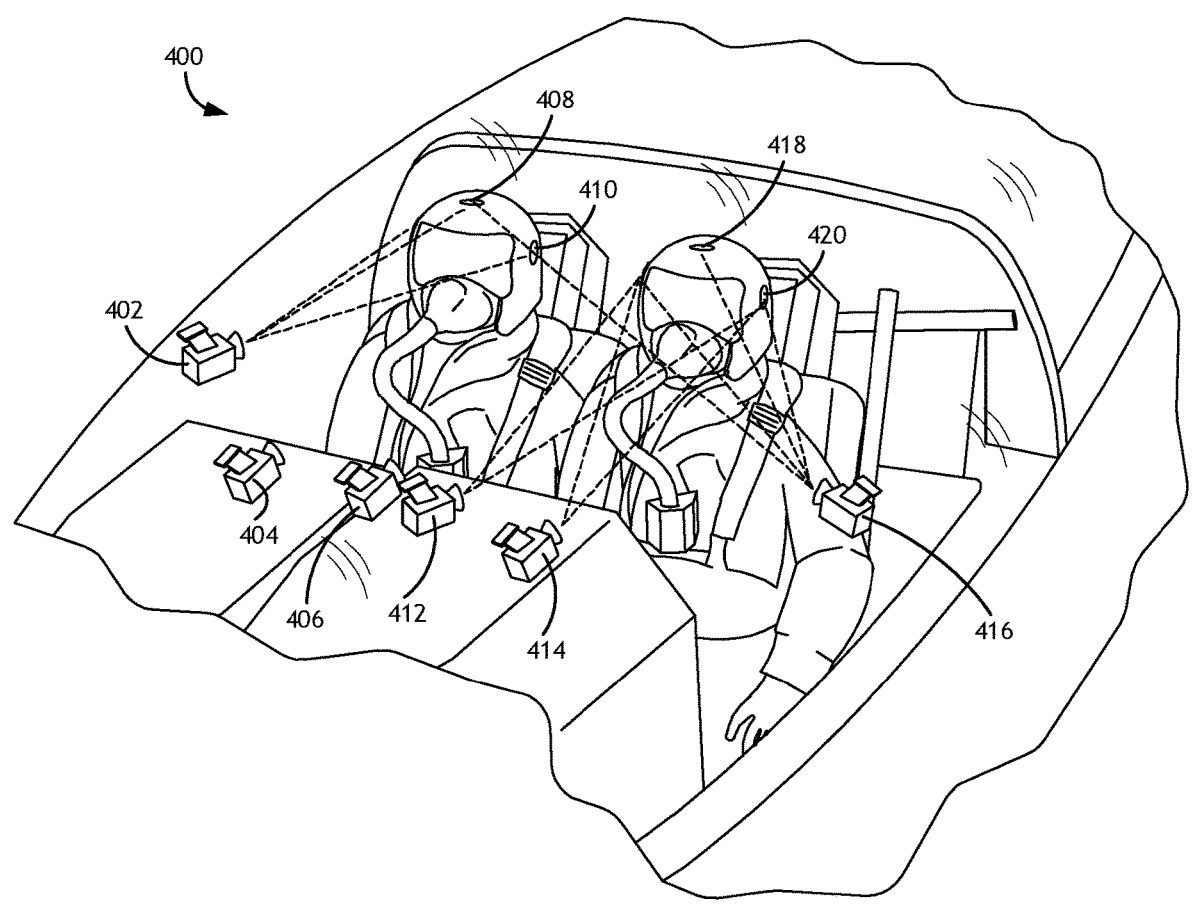
FIG. 4 shows an environmental view of a system according to an embodiment of the inventive concepts disclosed herein.

Referring to FIG. 4, an environmental view of a system 400 according to an embodiment of the inventive concepts disclosed herein is shown. The system 400 includes or is in data communication with one or more on-board computer systems configured for head-tracking of both a pilot a co-pilot. A first set of head-tracking cameras 402, 404, 406 is mounted at known positions in an aircraft cockpit to observe a plurality of fiducials 408, 410 associated with a first individual. Likewise, a second set of head-tracking cameras 412, 414, 416 is mounted at known positions in an aircraft cockpit to observe a plurality of fiducials 418, 420 associated with a second individual. Potentially disposed on a pilot's helmet. A processor determines a pose based on the plurality of fiducials 408, 410 as observed by the one or more head-tracking cameras 402, 404, 406.

Poses for the first individual and second individual are periodically calculated based on the corresponding sets of head-tracking cameras 402, 404, 406, 412, 414, 416. One or more of such cameras 402, 404, 406, 412, 414, 416 may be used as a verification camera for verifying the accuracy of the head pose of the other individual, either between refresh cycles or during routine image capture provided at least one camera 402, 404, 406, 412, 414, 416 is properly positioned and oriented. For example, during a first iteration, the first set of cameras 402, 404, 406 determines a head pose of a first individual based on the corresponding fiducials 408, 410 while a verification camera 416 in the second set of cameras 412, 414, 416 works to observe those fiducials 408, 410 and verify the accuracy of the head pose of the first individual according to the embodiments described herein. In another iteration, the second set of cameras 412, 414, 416 then determines a head pose of a second individual based on the corresponding fiducials 418, 420 while a verification camera 402 in the first set of cameras 402, 404, 406 works to observe those fiducials 418, 420 and verify the accuracy of the head pose of the second individual. The system operates back and forth to verify head poses for each individual when the first set of cameras 402, 404, 406 or second set of cameras 412, 414, 416 is not presently collecting images for head pose calculation.

Figure 5:
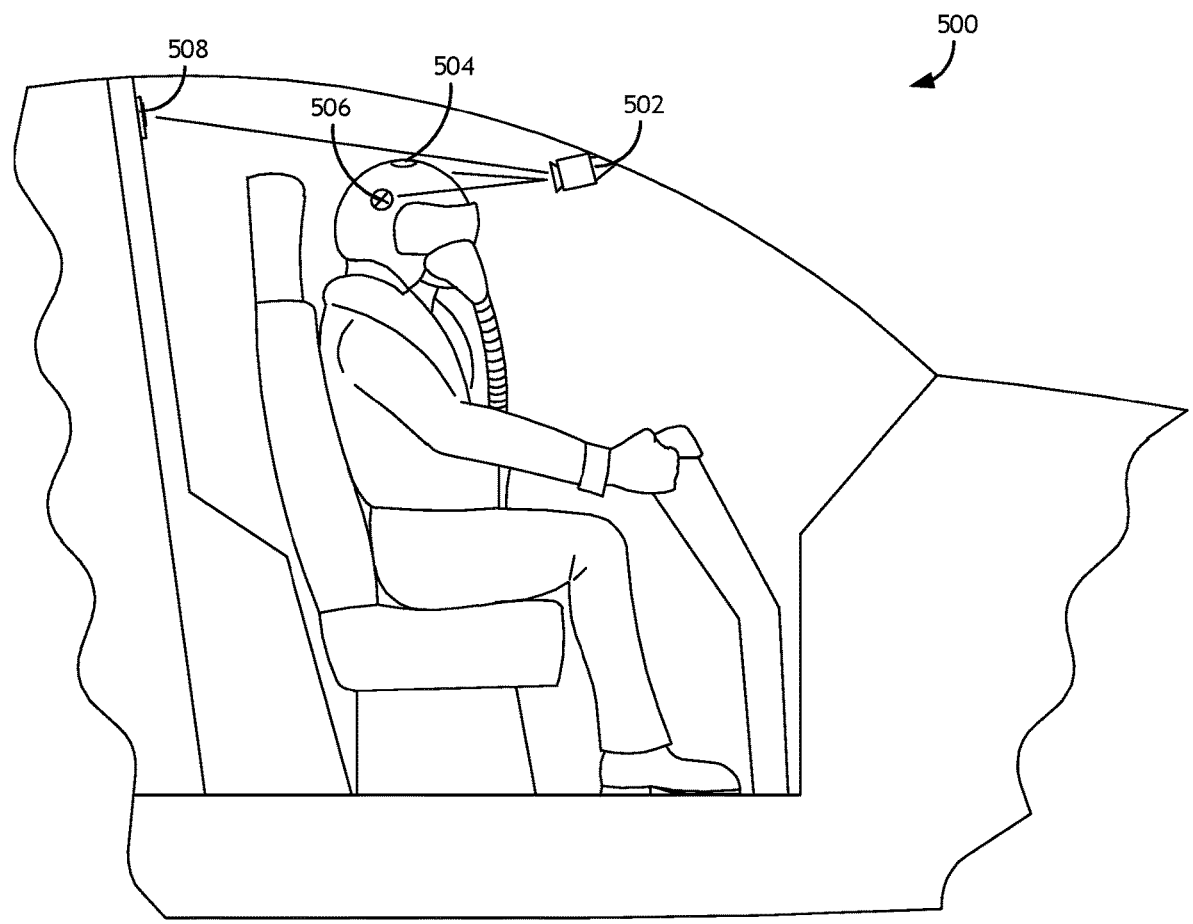
FIG. 5 shows an environmental view of a system according to an embodiment of the inventive concepts disclosed herein.

Referring to FIG. 5, an environmental view of a system 500 according to an embodiment of the inventive concepts disclosed herein is shown. The system 500 includes one or more head-tracking cameras 502 configured to image a plurality of fiducials 504, 506 and thereby calculate a head pose of an individual. Such as system 500 requires accurate calibration to operate correctly because the positions and orientations of the cameras 502 constitute a known variable in the algorithms for determining a head pose.

In at least one embodiment, atmospheric conditions may impact the positions and orientations of the cameras 502. For example, temperature and atmospheric pressure may change the size or geometry of the cockpit slightly, thereby altering the positions and orientations of the cameras 502. In at least one embodiment, one or more of the cameras 502 has a view of two or more calibrations fiducials 508 affixed to known locations in the cockpit. Based on a calculated geometry of the cockpit determined from the calibration fiducials 508 and the known, fixed locations of the calibration fiducials 508, the system 500 may determine a change to the actual size and/or shape of the cockpit and extrapolate a corresponding change to the position and orientation of the cameras 502.

In at least one embodiment, vibrations and the motion of aircraft within an outside frame of reference may cause discrepancies in the images collected from the cameras 502 that could be reflected in the corresponding calculated head poses. The system 500 may include a calibration fiducial 508 associated with each camera 502 affixed to a known location within the field of view of the corresponding camera 502 such that each image captured by the camera 502 may be transformed to maintain the calibration fiducial 508 within in the same in-camera location, regardless of vibrations or aircraft motion. Furthermore, because commercial head-tracking systems generally operate at a high frame rate, such frame-by-frame calibration may obviate the need for an inertial measurement unit to correct for aircraft motion.

In at least one embodiment, the calibration fiducials 508 may be embedded in a clear shell. Alternatively, the fiducials may comprise a material configured to fluoresce or otherwise operate within a spectrum visible to the cameras 502 but invisible or opaque to an individual.

Figure 6A:
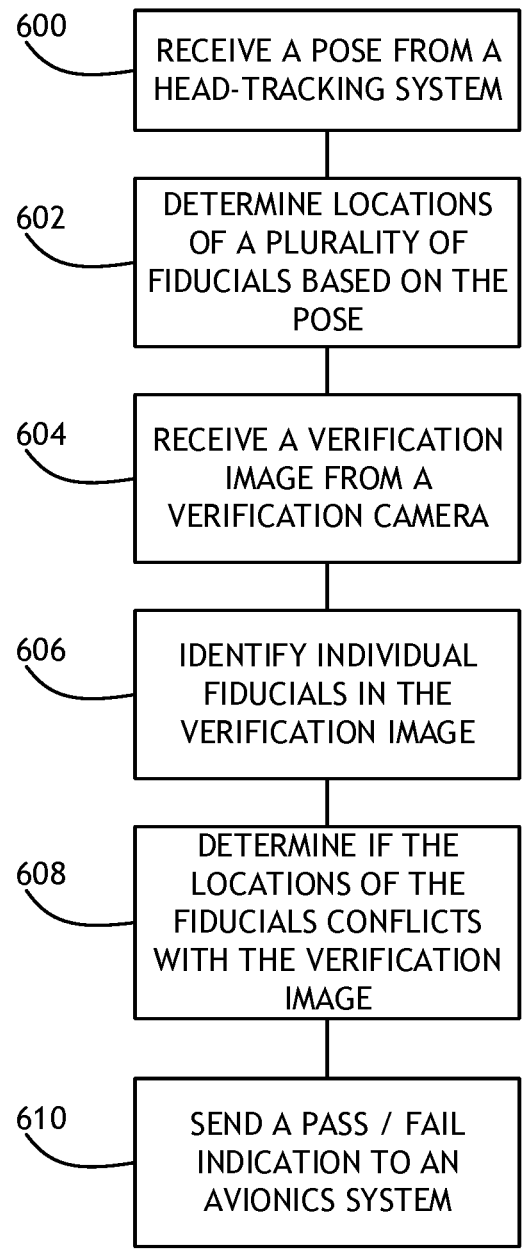
FIG. 6A shows a flowchart of a method for verifying head-tracking results according to an embodiment of the inventive concepts disclosed herein.
Figure 6B:
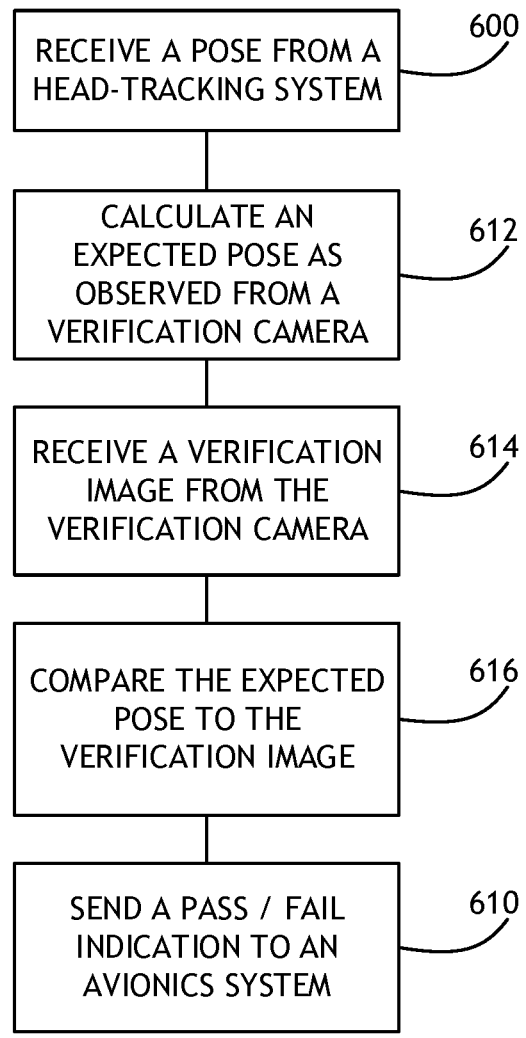
FIG. 6B shows a flowchart of a method for verifying head-tracking results according to an embodiment of the inventive concepts disclosed herein.

Referring to FIGS. 6A and 6B, flowcharts of methods for verifying head-tracking results according to an embodiment of the inventive concepts disclosed herein are shown. A computer system receives 600 a pose from a head-tracking system. In at least one embodiment, the computer system determines 602 a location for each of the plurality of fiducials used to calculate the pose. A verification image is received 604 from a verification camera, separate from the head-tracking cameras used to generate the pose and individual fiducials are identified 606 in the verification image. In at least one embodiment, each fiducial may be associated with an artifice for uniquely identifying the fiducial such as a predefined light pulsing pattern or frequency. The computer system may then compare the determined locations to the identified locations, determines 608 if the compared locations are consistent, and sends 610 a pass/fail indication to an avionics system utilizing the pose.

Alternatively, or in addition, in at least one embodiment, the computer system receives 600 a pose and calculates 612 an expected pose as observed from a separate verification camera based on the received pose from the head-tracking system. The computer system then receives 614 a verification image from the verification camera, determines a pose as observed from the verification camera, and compares 616 the calculated pose to the observed pose. If the observed pose and calculated pose are consistent, the system sends 610 a pass indication to the avionics system, otherwise the computer system sends 610 a fail indication.

Figure 7:
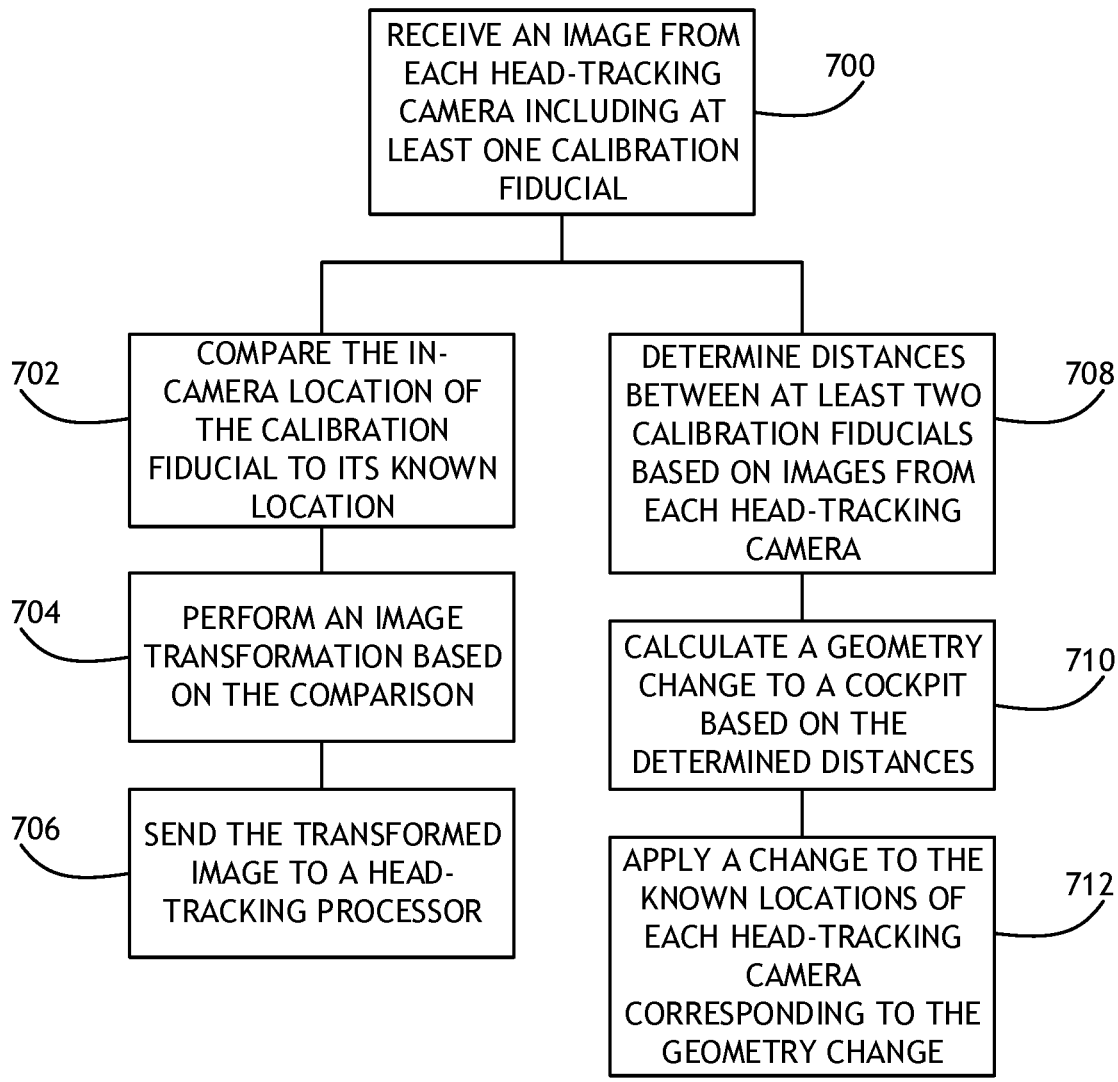
FIG. 7 shows a flowchart of a method for calibrating a head-tracking system according to an embodiment of the inventive concepts disclosed herein.

Referring to FIG. 7, a flowchart of a method for calibrating a head-tracking system according to an embodiment of the inventive concepts disclosed herein is shown. A computer system receives 700 an image from each of one or more head-tracking cameras. Each head-tracking camera is associated with one or more calibration fiducials at known, fixed locations within the field of view of the corresponding camera. In at least one embodiment, the computer system compares 702 the in-camera locations of the calibrations fiducials with their known locations: for example, one or more features of a calibration fiducial may be configured to appear at a specific pixel in an image; the comparison 702 determines the disparity between the expected pixel and the actual pixel where such feature appeared. Based on the comparison, the computer system performs 704 a transformation on the image such that all images maintain the calibration fiducial at the expected location. The transformed image is then sent 706 to a processor dedicated to producing head-tracking poses based on images from the one or more head-tracking cameras.

Alternatively, or in addition, in at least one embodiment, the computer system determines 708 one or more distances and orientations between at least two calibration fiducials within the field of view of a camera and calculates 710 a change to the geometry of the cockpit based on those distances and orientations. Based on the change to the geometry of the cockpit, the computer system determines a modification to the known locations of the head-tracking cameras and applies 712 such modification to future head-tracking pose calculations.

It may be appreciated that all of the embodiments presented herein are applicable to systems wherein the head-tracking system comprises head mounted cameras and cockpit mounted head-tracking fiducials except for embodiments requiring fiducials that are substantially stationary relative to the head-tracking cameras.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A method comprising:
   receiving a verification image from a verification camera;
   receiving a head pose from a head-tracking computer system;
   receiving images from each of one or more head-tracking cameras in the head-tracking system;
   identifying, in at least one image, at least two calibration fiducials disposed at fixed locations within a cockpit of an aircraft;
   comparing an in-camera location of the at least two calibration fiducials with an expected in-camera location to identify a disparity;
   transforming the at least one image based on the disparity;
   determining a change in relative positions or orientations of the at least two calibration fiducials;
   determining a change to a cockpit geometry based on the change in relative positions or orientations;
   modifying a predefined location of at least one head-tracking camera based on the change to cockpit geometry, the predefined location being used to determine the head pose; and
   determining if the verification image is consistent with the head pose;
   send a pass/fail indication to an avionics system.

2. The method of claim 1, further comprising determining an expected verification head pose comprising a head pose as would be observed from the location of the verification camera,
   wherein determining if the verification image is consistent with the head pose comprises comparing the expected verification head pose to the verification image.

3. The method of claim 1, further comprising determining an expected location for each of one or more head-tracking fiducials as observed from the location of the verification camera based on the determined head pose,
   wherein determining if the verification image is consistent with the head pose comprises comparing the expected locations to actual locations in the verification image.

4. The method of claim 3, further comprising identifying a light pulsing pattern unique to each head-tracking fiducial.

5. A computer apparatus comprising:
   a verification camera disposed at a fixed location within a cockpit;
   one or more head-tracking cameras;
   a verification processor in data communication with the verification camera and with a memory for storing processor executable code for configuring the verification processor to:
     receive a verification image from the verification camera;
     receive a head pose from a head-tracking system separate from the computer apparatus;
     determine if the verification image is consistent with the head pose; and
     send a pass/fail indication to an avionics system; and
   a head-tracking processor in data communication with the one or more head-tracking cameras, the head-tracking processor configured to:
     receive images from each of the one or more head-tracking cameras;
     identify, in at least one image, at least one of one or more calibration fiducials disposed at fixed locations within a cockpit of an aircraft;
     compare an in-camera location of the at least one of the one or more calibration fiducials with an expected in-camera location to identify a disparity;
     transform the at least one image based on the disparity;
     determine a change in relative positions or orientations of the one or more calibration fiducials;
     determine a change to a cockpit geometry based on the change in relative positions or orientations; and
     modify a predefined location of at least one head-tracking camera based on the change to cockpit geometry, the predefined location being used to determine the head pose.

6. The computer apparatus of claim 5, wherein:
   the verification processor is further configured to determine an expected verification head pose comprising a head pose as would be observed from the location of the verification camera; and
   determining if the verification image is consistent with the head pose comprises comparing the expected verification head pose to the verification image.

7. The computer apparatus of claim 5, wherein:
   the verification processor is further configured to determine an expected location for each of one or more head-tracking fiducials as observed from the location of the verification camera based on the determined head pose; and
   determining if the verification image is consistent with the head pose comprises comparing the expected locations to actual locations in the verification image.

8. The computer apparatus of claim 7, wherein each of the head-tracking fiducials comprises a light pulsing element, where each light pulsing element is configured to flash according to a pattern to uniquely identify the corresponding head-tracking fiducial.

9. The computer apparatus of claim 5, wherein:
   the verification camera comprises a head-tracking camera of a secondary head-tracking computer system; and
   the verification camera captures verification images for determining if the verification image is consistent with the head pose while capturing head-tracking images for determining a head pose for the secondary head-tracking computer system.

10. An aircraft comprising:
    one or more calibration fiducials disposed at fixed locations within a cockpit of the aircraft;
    a head-tracking computer system comprising:
      one or more head-tracking cameras; and a head-tracking processor in data communication with the one or more head-tracking cameras, the head-tracking processor configured to:
  receive images from each of the one or more head-tracking cameras;
  identify at least one of the one or more calibration fiducials in at least one image;
  compare an in-camera location of the at least one of the one or more calibration fiducials with an expected in-camera location to identify a disparity;
  transform the at least one image based on the disparity;
  identify each of a plurality of head-tracking fiducials in the images; and
  determine a head pose based on a location of each of the plurality of head-tracking fiducials; and
a head pose verification computer system comprising:
  a verification camera disposed at a fixed location within the cockpit, separate from the head-tracking cameras;
  a verification processor in data communication with the verification camera and with a memory for storing processor executable code for configuring the verification processor to:
    receive a verification image from the verification camera;
    determine an expected verification head pose comprising a head pose as would be observed from the location of the verification camera;
    receive the head pose;
    determine if the verification image is consistent with the head pose by comparing the expected verification head pose to the verification image; and
    send a pass/fail indication to an avionics system.

11. The aircraft of claim 10, wherein the head-tracking processor is further configured to:
  identify at least two calibration fiducials;
  determine a change in relative positions or orientations of the at least two calibration fiducials;
  determine a change to cockpit geometry based on the change in relative positions or orientations; and
  modify a predefined location of at least one head-tracking camera based on the change to cockpit geometry, the predefined location being used to determine the head pose.

12. The aircraft of claim 10, wherein:
  the verification processor is further configured to determine an expected location for each of one or more head-tracking fiducials as observed from the location of the verification camera based on the determined head pose; and
  determining if the verification image is consistent with the head pose comprises comparing the expected locations to actual locations in the verification image.

13. The aircraft of claim 12, wherein each of the head-tracking fiducials comprises a quick response (QR) code or ArUco code.

14. The aircraft of claim 10, further comprising a co-pilot head-tracking computer system comprising:
  a plurality of co-pilot head-tracking cameras; and
  a co-pilot head-tracking processor in data communication with the plurality of co-pilot head-tracking cameras, the co-pilot head-tracking processor configured to:
    receive a verification image from at least one of the co-pilot head-tracking cameras;
    receive the head pose;
    determine if the verification image is consistent with the head pose; and
    send a pass/fail indication to an avionics system.

* * * * *